June 15, 1971     T. L. SMITH     3,584,353
LOW BOLT CLAMP WITH STABILIZING FINGERS
Filed Oct. 27, 1969
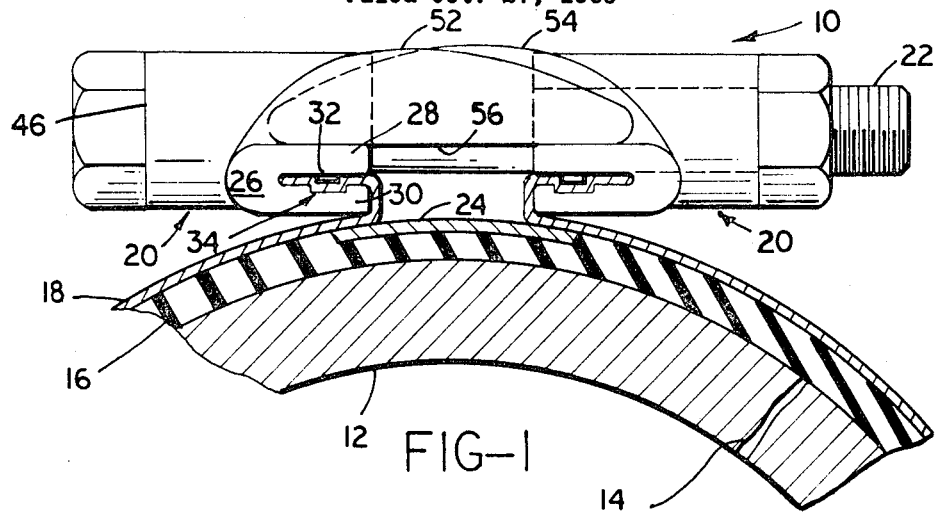
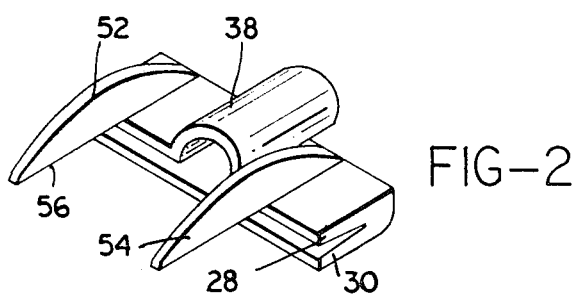
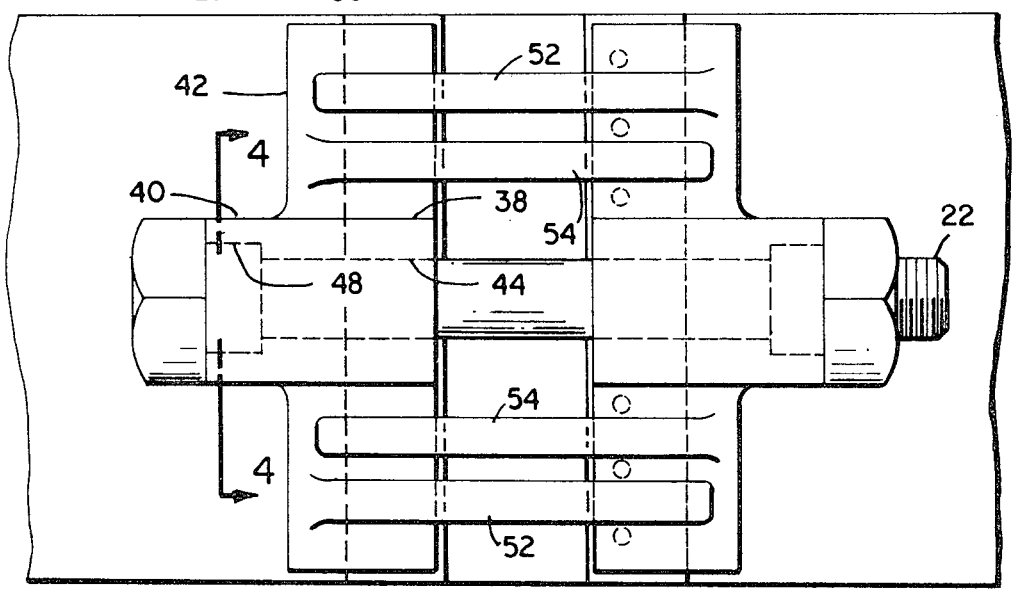
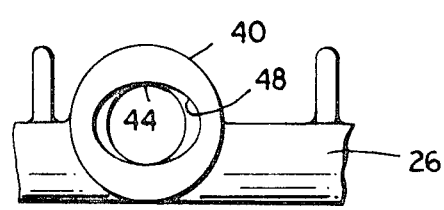
INVENTOR.
TELFORD L. SMITH
BY
*Owen, Wickersham & Erickson*
ATTORNEYS

United States Patent Office 3,584,353
Patented June 15, 1971

3,584,353
LOW BOLT CLAMP WITH STABILIZING FINGERS
Telford L. Smith, 1206 Lake St., Millbrae, Calif. 94030
Filed Oct. 27, 1969, Ser. No. 869,725
Int. Cl. F16l *19/00*
U.S. Cl. 24—279                                           3 Claims

ABSTRACT OF THE DISCLOSURE

Rigid lugs on a pipe clamp of the flexible band type having one or more boss portions for retaining bolts which are positioned relatively close to the pipe surface and fingers on each lug extending from opposite sides of each boss portion to engage the opposite lug. The combination of the bolt location relative to the pipe and the action of the lug fingers prevents lug twisting or lifting when bolts are tightened to draw the lugs and the ends of the band together.

---

This invention relates to pipe clamps of the flexible band type wherein rigid lugs fixed to the ends of the band around a pipe are drawn together by bolts, thereby tightening the band against a gasket located under the band directly adjacent the pipe surface.

One object of the present invention is to provide an improved pipe clamp that can be utilized effectively on a wide range of pipe sizes. More particularly, it is desired to provide a clamp that is useful even on relatively large pipes wherein the lugs are spaced apart by a considerable amount and a greater amount of band tension is required to maintain adequate gasket pressure in the area between the lugs. As band tension is increased by tightening the bolts there is a normal tendency for the lugs to tip toward each other and cause the bolts to bend.

Another problem which occurred with flexible band type clamps heretofore devised was that in tightening the bolts the lugs not only had the aforesaid tendency to tip or roll towards each other, but they also had the tendency to lift up at one end. This was caused by the torsion forces exerted on the bolts which created an imbalance of lug pressure on the band directly beneath the lug. Consequently, reduced gasket pressure occurred at certain areas beneath the lugs as the bolts were tightened and this increased the possibility of leakage. The aforesaid problems are solved by the present invention by a clamp with lugs having a combination of features that prevent both tipping or rolling and longitudinal twisting due to bolt tightening or torquing. Each lug is formed with a bar-like base portion having jaws that grip the edge of the band and one or more boss portions integral with the base portion for retaining a bolt. The bolts are retained in a low position adjacent the band end edge so that the force couple tending to tip the lugs is minimized. Extending from opposite sides of each lug are a pair of finger members which engage the opposite lug and further help to prevent tipping. Due to spacing of the finger members on opposite sides of each boss portion on a lug they also prevent longitudinal tipping of the lug as the clamp bolts are tightened.

Other objects, advantages and features of the present invention will become apparent from the following detailed description of one embodiment taken with accompanying drawings, in which:

FIG. 1 is a fragmentary view in side elevation and in section of a pipe clamp according to the invention;

FIG. 2 is a view in perspective of one lug for the clamp of FIG. 1, shown with its jaws open;

FIG. 3 is a plan view of the clamp of FIG. 1; and

FIG. 4 is a view in section taken along the line 4—4 in FIG. 3.

Referring to the drawing, FIG. 1 shows a pipe clamp 10 according to my invention, as it appears when installed on a pipe 12 which has some form of wall crack or opening 14 that caused leakage. Generally, the clamp comprises a gasket 16 made from a sheet of elastomeric material that fits around the pipe and covers the opening. Covering the gasket is a flexible sheet metal band 18 whose ends are secured to a pair of rigid lugs 20. With the band in place around the pipe the lugs are spaced apart and connected by one or more bolts 22. A sheet metal strip 24 is located on the outside of the gasket in the area between the lugs and provides a surface on which the lugs can move together as the bolts are tightened.

The lugs 20 comprise an important feature of my clamp because they make it possible to obtain a high degree of band tension and thus of gasket pressure without bending the bolts or allowing any twisting or tipping of the lugs. These lugs are preferably cast as an integral member from some suitable material such as malleable iron or bronze, and since they are identical in size and shape, they may be made from the same mold. Each lug has a bar-like base portion 26 that extends parallel to the axis of the pipe when the clamp is installed. This base portion has upper and lower jaw portions 28 and 30 which are originally cast in the open position, as shown in FIG. 2. One of the jaw portions is preferably provided with a series of spaced apart protuberances 32 which register with complementary recesses 34 in the other jaw portion. When a hooked end portion 36 of the band 18 is located between the jaw portions, the latter are closed in a press with the protuberances helping to grip the band, as shown in FIG. 1. Other means for gripping the band could be applied on the lugs 20 and it should be understood that the scope of my invention should not be limited by the particular band attaching arrangement shown.

Extending above the upper surface of the base portion and spaced from the end thereof on each lug is a boss-like member 38 having a generally cylindrical shaped portion 40 that extends rearwardly from the rear edge 42 of the base portion. An axial bore 44 through the boss member extends from a rear face 46 on the cylindrical portion and cuts through the upper jaw but not the lower jaw of the base portion. Thus when the jaws of the lug are closed, as shown in FIG. 1, the bolt through each lug is located only slightly above the hooked end portion of the band. This greatly reduces the force couple on the lug produced by the bolt and the end of the band when the clamp is tightened. At the outer face of the boss member the bore 44 is preferably countersunk with an elliptical or square recess 48 to prevent the bolt from rotating when its nut accommodates a similar shaped head portion of a bolt and thereby is tightened. The bolts used with the clamp may be of any suitable type such as carriage bolts or standard bolts with flat sided heads or round heads and a threaded end portion to which a nut 50 is connected on the opposite lug. In the embodiment illustrated in the drawing each lug 20 has only one boss member. However, it is apparent that clamps utilizing my invention may have lugs of various lengths with one or more boss members which are uniformly spaced apart.

On opposite sides of each boss portion on each lug are a pair of finger members 52 and 54 that extend outwardly from the edge of the upper jaw portion. These fingers serve as stabilizing members since they are long enough in each case to extend across to the opposite lug. A lower surface 56 on each finger is essentially co-planar with the upper surface of the lug base portion and thus lies flush on and bears downwardly upon the upper surface of the opposite lug. Both finger members thus help to prevent lug tipping during bolt tightening when they are mutually so engaged with the opposite lug member. In addition to the aforesaid function the provision of the two finger members 52 and 54 on both sides of each boss portion and thus on both sides of each bolth serves to prevent longitudinal tipping or rocking of the lug base portion and thus on both sides of each bolt serves to lugs wherein the gasket pressure in certain areas under the lugs decreased and allowed leakage when high torque was applied to the bolts. As shown in the plan view of FIG. 3, the finger 52 located on the right side of each boss member (viewed when looking from one lug toward the other lug) is farther from the boss member than the other finger member 54. This arrangement allows the finger 52 to have a longer moment arm between it and the boss member and therefore to be more effective in resisting any longitudinal rocking due to excessive torquing of a bolt which normally has right hand threads.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting:

I claim:

1. In a pipe clamp of the type having a flexible band with ends secured to rigid lugs, with the lugs in pairs and tightened together by bolts, the combination wherein each lug comprises an elongated base portion having upper and lower closeable jaw means for gripping one end of the band, an integral boss member on said base portion extending upwardly above said upper jaw means and having an overhanging portion extending rearwardly from said base portion, said boss portion having a cylindrical bore whose axis is generally perpendicular to the longitudinal axis of said base portion and extends through said upper jaw means, and a pair of stabilizing fingers located on opposite sides of but at different distances from said boss member, said fingers extending generally parallel to its bore axis and beyond the inner longitudinal edge of said upper jaw means so as to engage the upper surface of the base portion on a similar mating lug when the clamp is installed on a pipe.

2. The clamp as described in claim 1 wherein said overhanging portion of each said boss member has a generally cylindrical shape.

3. The clamp as described in claim 1 including an elliptical recess in the end face of each overhanging portion of a boss member.

References Cited

UNITED STATES PATENTS

| | | | |
|---|---|---|---|
| 2,897,567 | 8/1959 | Hoke | 24—279 |
| 3,089,212 | 5/1963 | Graham et al. | 24—279 |
| 3,151,632 | 10/1964 | Risley et al. | 138—99 |
| 3,183,938 | 5/1965 | Smith et al. | 138—99 |

DONALD A. GRIFFIN, Primary Examiner

U.S. Cl. X.R.

138—99

UNITED STATES PATENT OFFICE
CERTIFICATE OF CORRECTION

Patent No. 3,584,353          Dated June 15, 1971

Inventor(s) Telford L. Smith

It is certified that error appears in the above-identified patent and that said Letters Patent are hereby corrected as shown below:

Column 3, line 4, after "portion", insert a period; lines 4 and 5, cancel "and thus on both sides of each bolt serves to lugs", and insert -- This, in turn, eliminates a problem with prior art lugs -- .

Signed and sealed this 24th day of October 1972.

(SEAL)
Attest:

EDWARD M. FLETCHER, JR.          ROBERT GOTTSCHALK
Attesting Officer                Commissioner of Patents